(12) United States Patent
Herbold

(10) Patent No.: US 9,089,878 B2
(45) Date of Patent: Jul. 28, 2015

(54) METHOD AND APPARATUS FOR PRE-CLEANING PARTS MADE OF PLASTIC

(75) Inventor: Karlheinz Herbold, Meckesheim (DE)

(73) Assignee: Herbold Meckesheim GmbH, Meckesheim (DE)

( * ) Notice: Subject to any disclaimer, the term of this patent is extended or adjusted under 35 U.S.C. 154(b) by 0 days.

(21) Appl. No.: 13/144,849

(22) PCT Filed: Jul. 26, 2010

(86) PCT No.: PCT/DE2010/000872
§ 371 (c)(1),
(2), (4) Date: Jul. 15, 2011

(87) PCT Pub. No.: WO2011/012113
PCT Pub. Date: Feb. 3, 2011

(65) Prior Publication Data
US 2011/0271982 A1    Nov. 10, 2011

(30) Foreign Application Priority Data

Jul. 27, 2009   (DE) .......................... 10 2009 034 899

(51) Int. Cl.
| | |
|---|---|
| *B08B 7/02* | (2006.01) |
| *B08B 9/08* | (2006.01) |
| *B29B 17/02* | (2006.01) |

(Continued)

(52) U.S. Cl.
CPC . *B08B 7/02* (2013.01); *B08B 9/083* (2013.01); *B29B 17/02* (2013.01); *B29K 2067/003* (2013.01); *B29K 2105/065* (2013.01);

(Continued)

(58) Field of Classification Search
CPC ............................ B08B 2220/02; B08B 9/083
USPC ........ 134/6, 16, 25.4; 156/709, 344, 584, 764
See application file for complete search history.

(56) References Cited

U.S. PATENT DOCUMENTS 4,599,131 A * 7/1986 Matuszak ...................... 156/750
5,289,978 A * 3/1994 Lundquist ........................ 241/57

(Continued)

FOREIGN PATENT DOCUMENTS

| DE | 103 08 500 | 9/2004 |
|---|---|---|
| DE | 10308500 A1 * | 9/2004 |

(Continued)

OTHER PUBLICATIONS

International Search Report for International Application No. PCT/DE2010/000872.

(Continued)

*Primary Examiner* — Nicole Blan
(74) *Attorney, Agent, or Firm* — Alston & Bird LLP

(57) ABSTRACT

The invention relates to a method for pre-cleaning parts made of plastic as part of a recycling process, wherein foreign bodies to be removed adhere to the parts, in particular for removing foreign bodies on parts made of plastic, preferably for removing labels, dirt, etc. on used plastic bottles, said method being characterized in that the foreign bodies are removed from the parts by mechanically loading the parts. A device for applying the method is characterized by a housing (2) having a chamber for accommodating the parts, means (3, 4, 11) for mechanically acting upon the parts and means for separating the foreign bodies released from the parts and for discharging the foreign bodies and parts onto separate paths being provided in the chamber.

10 Claims, 8 Drawing Sheets

(51) Int. Cl.
  *B29L 31/00*   (2006.01)
  *B29L 31/56*   (2006.01)
  *B29K 67/00*   (2006.01)
  *B29K 105/06*  (2006.01)

(52) U.S. Cl.
  CPC .... *B29L2031/565* (2013.01); *B29L 2031/7158* (2013.01); *B29L 2031/744* (2013.01)

(56) References Cited

U.S. PATENT DOCUMENTS 6,568,410 B1 * 5/2003 Teruggi et al. ............... 134/120
2003/0070754 A1 * 4/2003 Francis et al. ............... 156/344

FOREIGN PATENT DOCUMENTS

| | | |
|---|---|---|
| EP | 2050516 A1 | 4/2009 |
| WO | WO 2009/033587 | 3/2009 |
| WO | WO 2009050549 A2 * | 4/2009 |

OTHER PUBLICATIONS

Written Opinion for Application No. PCT/DE2010/000872.

* cited by examiner

METHOD AND APPARATUS FOR PRE-CLEANING PARTS MADE OF PLASTIC

BACKGROUND OF THE INVENTION

1. Field of the Invention

The invention relates to a method for pre-cleaning parts, which are made of plastic and to which foreign bodies to be removed are stuck, as part of a recycling process, more particularly for removing foreign bodies disposed on parts made of plastic, preferably for removing labels, dirt, etc. disposed on used plastic bottles such as PET bottles.

The invention further relates to an apparatus for applying the method of the invention.

2. Description of Related Art

Equipment and methods for treating plastic waste (e.g., PET bottles) are known from practical experience. Here, any dirt is removed usually by subjecting the plastic waste to a wet-washing process.

Even a hot-washing process is often required with the addition of cleaning chemicals such as caustic soda solution, NaOH, etc. Here, the washing medium is constantly reconditioned, which results in high outlay and considerable environmental pollution if the washing medium is discharged as waste water on completion of the washing process.

One particular problem is the impurities or foreign bodies disposed on plastic bottles such as the so-called PET bottles. For recycling the PET bottles, it is necessary to remove the labels that are made of a different material than the bottles and are mostly printed. They are often made of PVC and can be removed only with difficulty in a conventional washing plant. Moreover, other foreign bodies such as stones, glass, small pieces of metal, etc. that are not collected by an overband magnetic separator remain stuck to the PET bottles. These foreign bodies must also be removed from the plastic to be recycled.

Furthermore, it is significant that the foreign bodies stuck to the PET bottles are often abrasive components. If these abrasive components are not removed before the comminution or grinding process of the PET bottles, they result in a considerable amount of wear of the mill. Furthermore, any residual content of the bottles must be removed since the sticky sugared water results in disturbances during the further processing and recycling. Moreover, residual liquid in the bottles stresses the wastewater treatment plants.

The object underlying the present invention is therefore to specify a method and an apparatus for pre-cleaning parts made of plastic as part of a recycling process, as a result of which it is possible to recycle plastic without any problems. The invention aims to reduce the contamination of the water cycle to a minimum.

SUMMARY OF VARIOUS EMBODIMENTS

As for the method of the invention, the object mentioned above is achieved according to the invention by the features of various method embodiments described herein. Accordingly, the generic method is characterized in that the foreign bodies are removed from the parts by applying mechanical stress to the parts.

As for the apparatus of the invention, the above object is achieved by the features defined in various apparatus embodiments described herein. Accordingly, the generic apparatus is characterized by a housing comprising a chamber for receiving the parts, means for applying mechanical stress to the parts, means for separating the foreign bodies released from the parts, and means for discharging the foreign bodies and parts onto separate paths being provided in the chamber.

One finding according to the invention is that it is easily possible to remove the foreign bodies stuck to the plastic parts to be recycled by applying mechanical stress to the parts. If the parts are stressed purely mechanically, it is not required to prewash the parts with steam, which consumes excessive energy. Furthermore, it is essential to the method of the invention that the removal of the foreign bodies is carried out without first comminuting the parts or PET bottles. Accordingly, the mill is not stressed by abrasive foreign bodies. Quite the contrary, the parts made of plastic are stressed mechanically according to the method of the invention without an upstream comminution of the plastic parts in such a way that the foreign bodies, no matter of what type, are detached from the plastic parts.

The movement of the plastic parts inside the apparatus results in the development of friction of the plastic parts against each other and against the machine parts and this friction likewise brings about or at least promotes a release of impurities.

In a very advantageous manner, the foreign bodies are removed from the parts or the PET bottles exclusively mechanically. The mechanical stress can mean a deformation of the parts so that the foreign bodies are detached from the parts due to the deformation of the same. More particularly, it is feasible for the parts to be deformed by bending, compressing and/or stretching processes, as a result of which the foreign bodies are detached from the parts.

In principle, it is also possible for the foreign bodies to be removed from the parts by the additional action of a liquid or steam, the parts being subjected to a mechanical action in either case. It is also feasible for the foreign bodies to be removed from the parts by the additional action of heat or cold in order to promote the detachment of the foreign bodies from the parts.

Very advantageously, the foreign bodies are knocked off effectively from the parts or PET bottles. In doing so, the foreign bodies can be comminuted, which promotes a separation of the foreign bodies from the parts to be recycled.

If there is any residual liquid in the bottles to be recycled, it would be advantageous to allow the liquid to drain off from the bottles. For this purpose, the parts or bottles could be at least slightly scored or cut as part of the application of mechanical stress, but not comminuted. The advantage of scoring the parts is that any liquid located in the bottles travels outwardly without the risk of prematurely comminuting the PET bottles, which would consequently make it difficult to separate the PET material from the foreign bodies.

After being collected, the parts or bottles to be recycled are usually compacted into bales and compressed accordingly. The material to be recycled is supplied in this form to the recycling process. For purposes of the pre-cleaning process of the invention, the bale is disintegrated and the parts are isolated and supplied in isolated form to the pre-cleaning process. Accordingly, the foreign bodies are removed after a disintegration of the bale or isolation of the parts, which promotes the pre-cleaning process very considerably.

Furthermore, it is very advantageous if the foreign bodies are removed over a pre-definable retention time and/or pre-definable stress intensity. Both parameters are adjustable and can be adjusted and optimized in dependence of each other as far as possible and in dependence of the material or the degree of soiling.

Basically, it cannot be ruled out that small portions of the PET bottles are cut off from the same during the pre-cleaning process and are separated together with the foreign bodies even though it is exclusively the foreign bodies that are to be separated. It is advantageous in this respect if the foreign bodies detached and separated from the parts are supplied together with plastic portions to a repeat separation process, in which the remaining plastic portions of the PET bottles are separated again and supplied to the recycling process. The actual dirt, i.e., the foreign bodies detached from the bottles such as labels, metal, etc. is then disposed of or supplied to a further recycling process.

It should be noted at this point that the actual recycling process follows the method of the invention, the parts or bottles freed of foreign bodies being preferably supplied by means of a conveyor to the further recycling process that is then carried out in a known manner per se.

The apparatus of the invention comprises a housing comprising a chamber for receiving the parts or PET bottles, means for applying mechanical stress to the parts, means for separating the foreign bodies released from the parts, and means for discharging the foreign bodies and parts onto separate paths being provided in the chamber.

In other words, the mechanically detached foreign bodies are supplied, for example, by means of a perforated plate having holes of a suitably defined diameter to a conveyor located below the housing or the chamber as far as possible. The foreign bodies could travel here by means of a conveyor screw to a repeat separation process carried out in a cyclone, for example. Here, the foreign bodies are again separated from the residual plastic portions that are then supplied again to the recycling process.

The chamber used for the pre-cleaning process could be in the form of a centrifugal device or a drum. A rotor comprising stress-applying means is provided in the housing or in the chamber. Basically, it is advantageous if the rotor disposed inside rotates relative to the housing. A reverse function is also feasible.

The stress-applying means could be of various forms. For example, they can be in the form of bars, vanes, paddles or the like. It is also feasible for the stress-applying means to comprise blades, and the bars, vanes, paddles or the like can be equipped, at least in part, with blades that serve for scoring the plastic parts or the PET bottles. It should be noted at this point that it is very advantageous if the parts or PET bottles are not comminuted as part of the pre-cleaning process. Accordingly, the blades must be configured such that the bottles are at the most scored, but not cut up.

BRIEF DESCRIPTION OF THE SEVERAL VIEWS OF THE DRAWINGS

There are different possibilities of implementing and developing the teaching of the present invention to advantage. For this purpose, reference should be made to the following explanation of a preferred exemplary embodiment of the invention with reference to the drawings. Generally preferred design forms and developments of the teaching of this invention have also been described in conjunction with the explanation of the preferred exemplary embodiment of the invention with reference to the drawings, in which.

DETAILED DESCRIPTION

Figure 1:
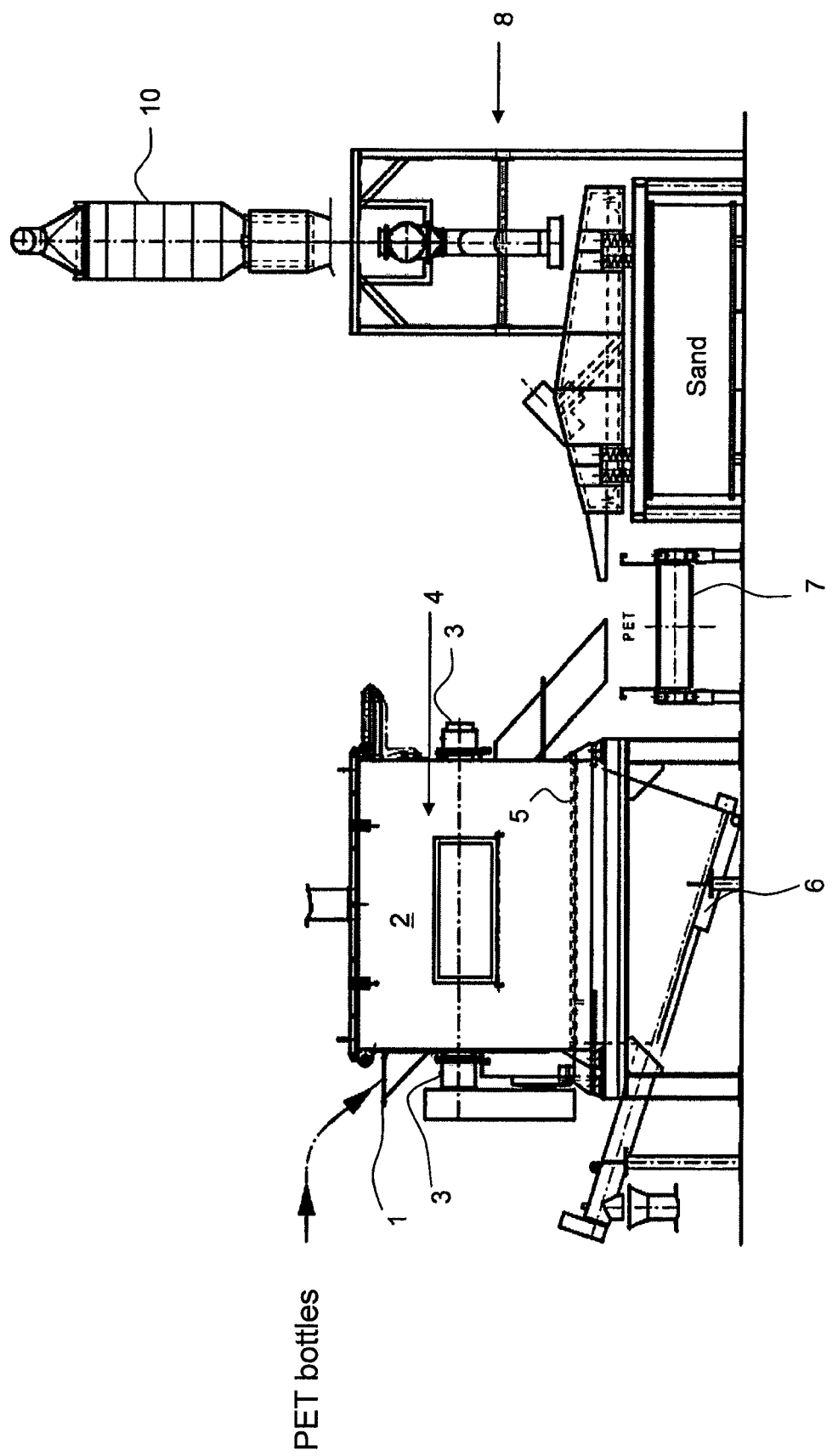
FIG. 1 shows an exemplary embodiment of the apparatus of the invention in a diagrammatic side-vi
Figure 2:
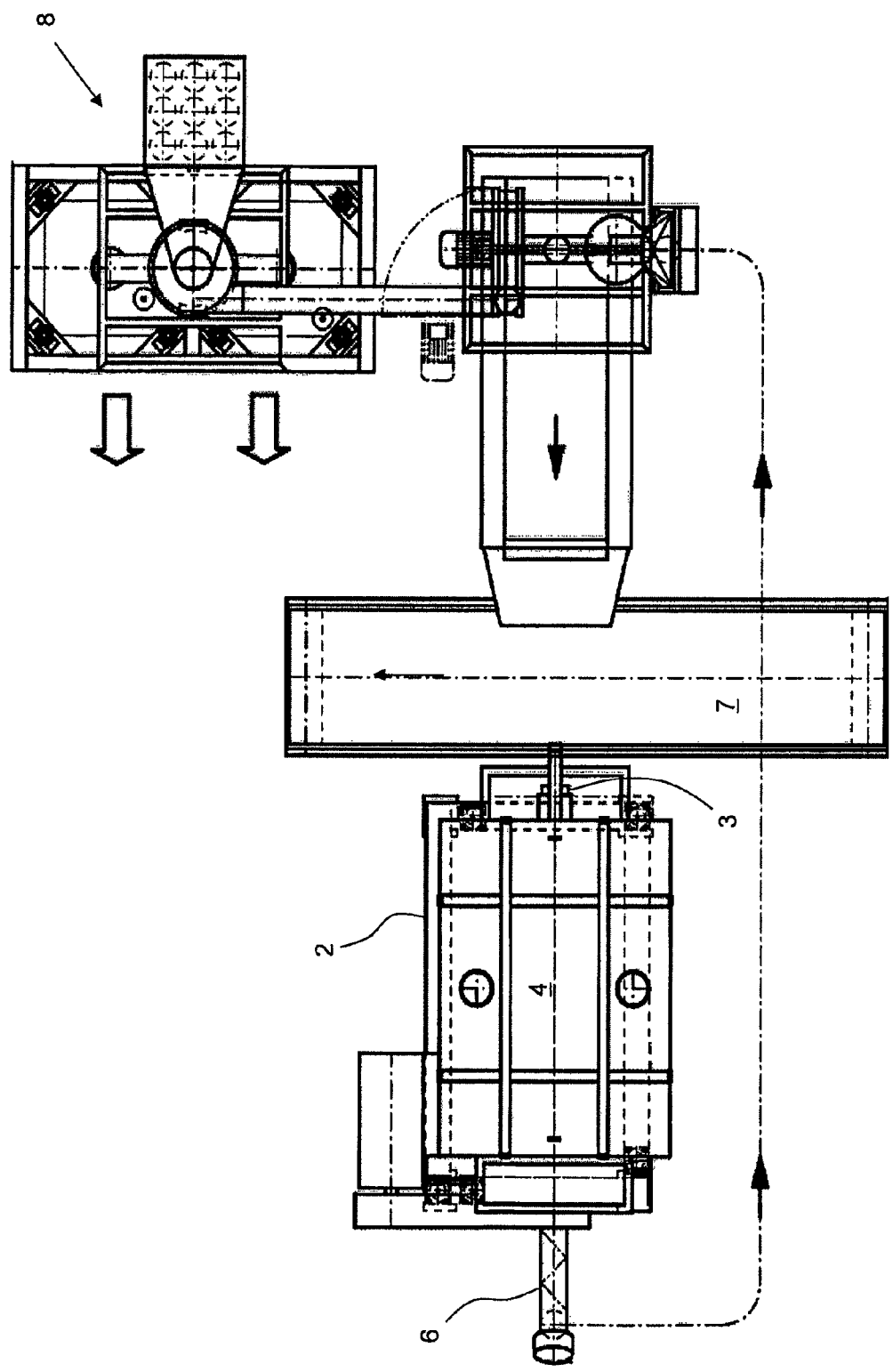
FIG. 2 shows the item shown in FIG. 1 in a diagrammatic top view.

FIG. 1 shows an exemplary embodiment of an apparatus of the invention in a diagrammatic side-view, which apparatus is taken as the basis for describing the method of the invention.

Figure 5:
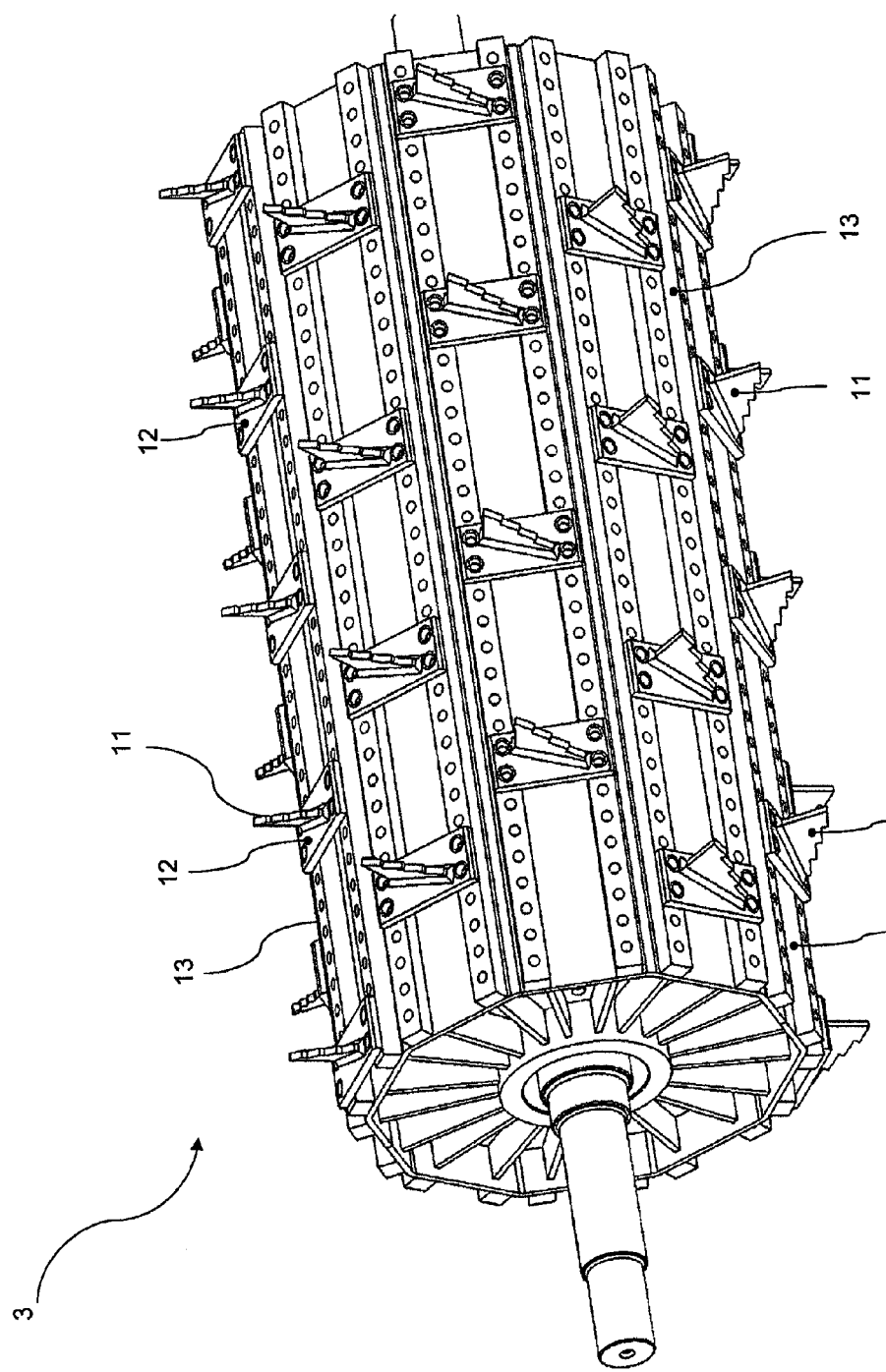
FIG. 5 shows an exemplary embodiment of a rotor equipped with tools in a diagrammatic side-view.
Figure 6:
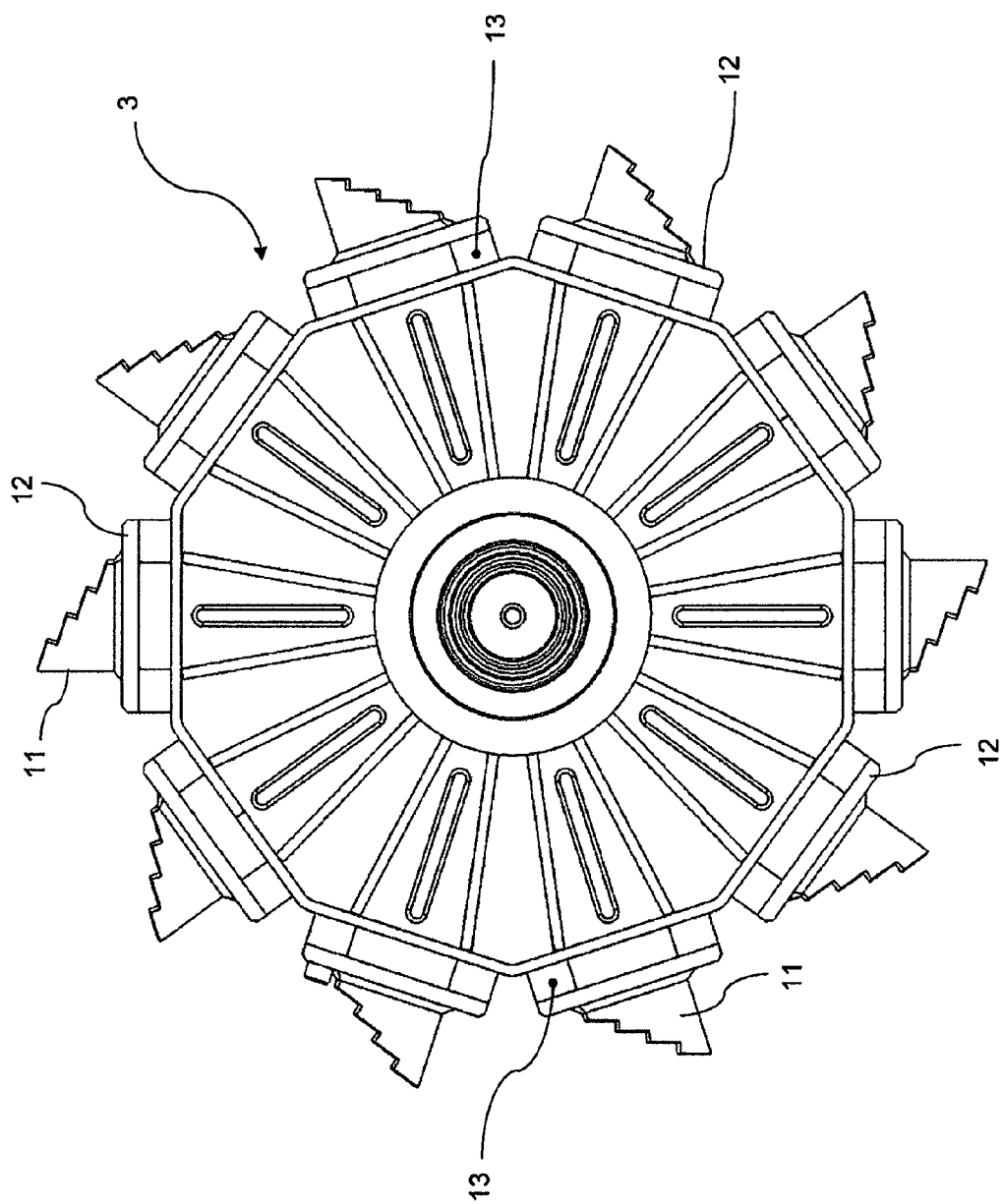
FIG. 6 shows the item shown in FIG. 5 in a diagrammatic front view.

The exemplary embodiment selected here involves the recycling of so-called PET bottles that are supplied, preferably in isolated form, to the apparatus of the invention. The bottles are supplied by means of a feed chute 1 in the exemplary embodiment shown in FIG. 1. Instead of providing a feed chute, a forced feed system comprising one or more conveyor screws could be provided in order to promote throughput. Furthermore, the forced feed system, for example, the so-called screw-feed system, is suitable more particularly in the rotor variant that is shown in FIGS. 5 and 6 and that functions very effectively on the basis of a forced feed system.

It should be noted that the apparatus of the invention works ideally in a dry process stage namely due to the constructive features described hereinafter.

The apparatus shown in FIG. 1 comprises a housing 2 comprising a chamber located therein. A rotor 3 that is equipped with shovels 4 or tools 11 is disposed inside the housing 2 or in the chamber. Dirt located on the PET bottles or foreign bodies located on the same, for example, labels are knocked off effectively by the shovels 4 or the tools 11.

The foreign bodies that are knocked off travel by way of a perforated plate 5 onto or into a screw conveyor 6 and are supplied from here to an additional process of separation.

The PET bottles freed of the foreign bodies are transported from the apparatus or the housing 2 onto a conveyor belt 7 and are supplied from here to a further recycling process.

Figure 3:
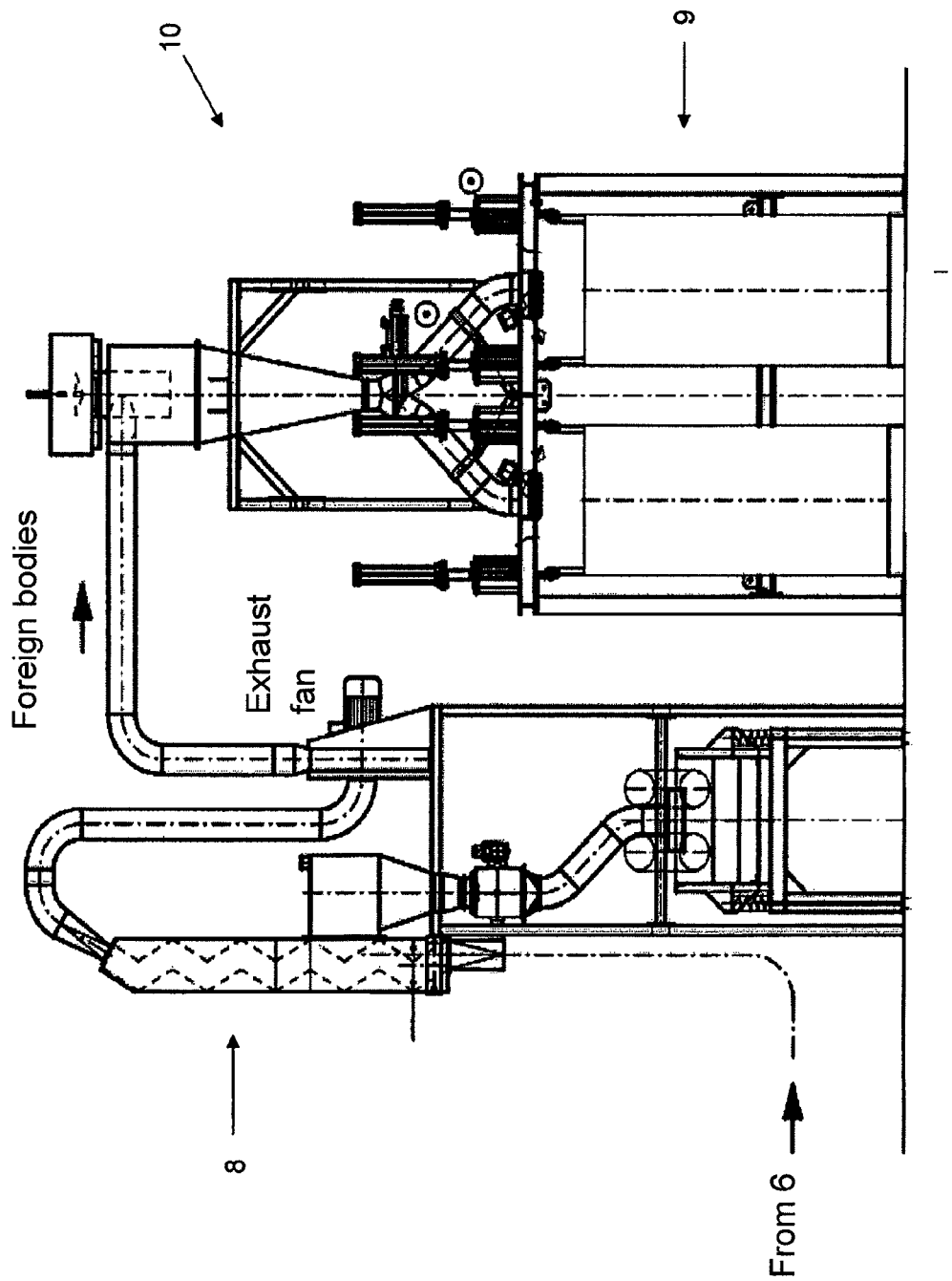
FIG. 3 shows the separation of any residual plastic portions from the foreign bodies in a diagrammatic side-view, and FIG. 4*a* diagrammatically represents the sequence of the method of the invention in a first variant, FIG. 4*b* diagrammatically represents the sequence of the method of the invention in a second variant.

The foreign bodies detached from the PET bottles travel by means of the screw conveyor 6 into a separator 8 that is independent thereof and that comprises a zigzag channel and a cyclone 10. Here, residual plastic portions that have been accidentally knocked off from the PET bottles are separated from the foreign bodies and supplied to the conveyor belt 7 so that these parts are also available for the recycling process. As shown in the representation of FIG. 3, the remainder, i.e., the labels and the dirt or the foreign bodies are then supplied to a waste station 9 and a process of separation can be carried out here also.

Figure 4A:
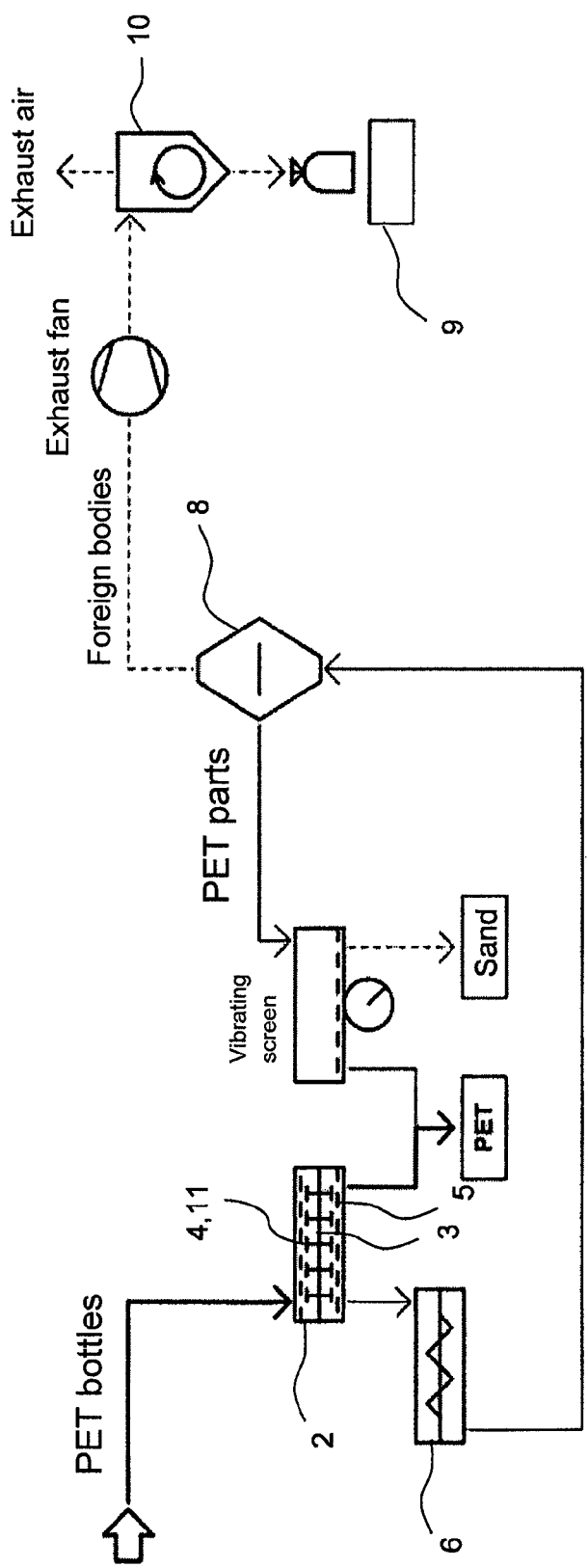

FIG. 4*a* diagrammatically represents the sequence of the method of the invention, the parts or the PET bottles to be recycled being supplied in an isolated form to the apparatus of the invention and thus to the housing 2. The rotor 3 comprising the shovels 4 is disposed in the housing 2, as suggested in FIG. 4*a*.

Labels, dirt, etc. that have been knocked off from the PET bottles preferably travel through the perforated plate 5 by means of a screw conveyor 6 to an additional separator 8 that can operate by means of gravitational force. Plastic portions separated from the labels and dirt can be supplied to the recycling process.

The PET bottles freed of the foreign bodies are conveyed from the housing 2 onto the conveyor belt 7 and from here to the further recycling process. As mentioned above, the foreign bodies released travel together with the residual plastic portions by means of the screw conveyor 6 to the additional separator 8, from where the residual plastic portions are likewise supplied after an additional process of separation to the conveyor belt 7 and thus to the recycling process.

Preferably, the released foreign bodies are supplied in the conventional manner by means of a cyclone 10 to a waste station 9, where a cleanly sorted separation is likewise possible, but not strictly necessary.

It should be noted at this point that the apparatus of the invention can be without a screen or a perforated plate, in which case the fractionation is carried out inside a closed drum or inside a closed housing 2 made of imperforated sheet metal. Downstream of the apparatus or the housing 2, a separation into a usable fraction and an unusable fraction would then take place namely in order to separate the bottles from labels or dirt here.

It is also feasible to arrange a screening machine downstream of the apparatus instead of a converting air separation, which screening machine is suctioned for the removal of the so-called light fraction. Such a device can comprise a hood above the screening machine, and a ventilation hood connection is provided in the hood. Lastly, the screening machine here can also be a type of air separator comprising an automatic extraction system.

Figure 4B:
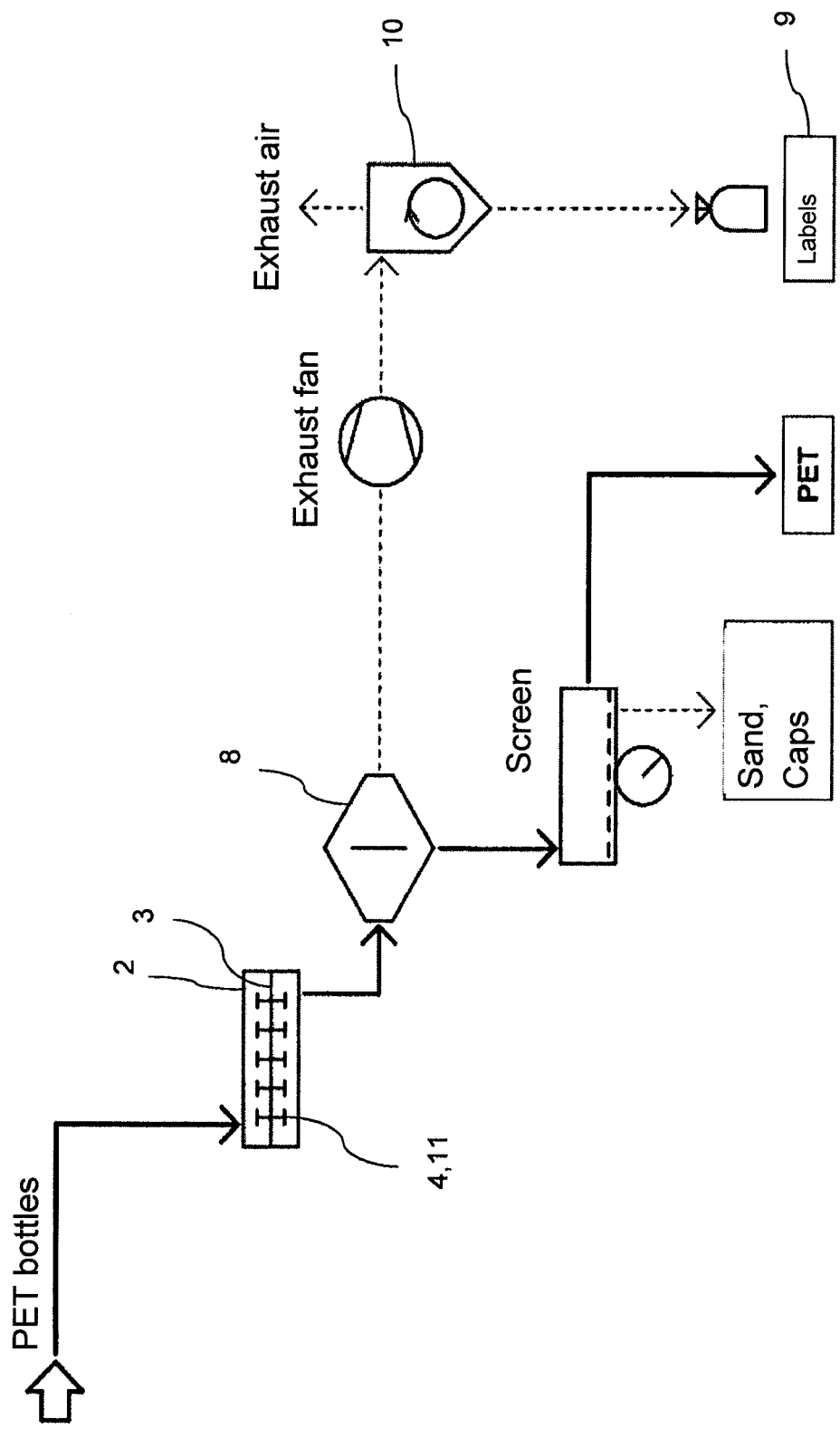

FIG. 4b diagrammatically represents a possible sequence of the method of the invention in a second variant, in which the PET bottles containing dirt, labels or the like are supplied to the apparatus of the invention, namely to the housing 2, in which there is disposed a rotor 3 comprising suitable tools 11. The rotor 3 rotates relative to the housing 2. Basically, a relative movement between the rotor 3 and the housing 2 is necessary, no matter which component rotates actively in doing so.

Inside the housing 2 that is also referred to as the outer drum, labels and caps are separated from the actual PET bottle without disturbing or knocking off the bottle head, in which case a separation of the cap from the bottle neck would be possible only with considerable effort or would not be possible at all.

In any case, the comminuted material travels from the apparatus or the housing 2 into a separator 8 that is understood to mean a separation stage and that can operate by means of gravitational force, for example.

As for the rotor 3 disposed in the housing 2, it is essential that the rotor 3 together with its tools 11 (see FIGS. 5, 6, and 7) and the outer drum or the housing 2 be able to remove labels and caps from the containers or PET bottles without disturbing the bottle necks in doing so. This is of particular significance especially because a destruction of the bottle necks would result in a loss of material in the recycling process since the bottle necks would have to be separated together with the caps.

Preferably, the outer drum or the housing 2 is rotationally fixed, and the rotor 3 rotates. The reverse kinematics is also feasible. As a rule, the axles of the housing 2 or the outer drum and the rotor 3 are disposed so as to be coaxial. An eccentric arrangement of the rotor 3 inside the housing 2 is feasible and can even be advantageous in order to define zones, in which the bottles are acted upon with varying intensity inside the housing 2.

The separator 8 or the separation stage shown in FIG. 4b serves for separating the isolated labels even upstream of the screening machine or the screen so that only the actual bottle material together with the caps is supplied to the screen.

FIG. 5 shows an exemplary embodiment of a rotor 3 in a diagrammatic side-view, and the manner in which the rotor 3 can be arranged in the housing 2 or in the outer drum formed by the housing 2. In the exemplary embodiment selected in FIG. 5, the rotor 3 has an angular cross-section, but it can also have a circular periphery, if required.

FIG. 5 clearly shows that the rotor 3 comprises attachment strips 13 that, in pairs, serve for mounting the tools 11 disposed on holding plates 12. The tools 11 are disposed in such a way that they define a spin and thus a conveying direction during a rotation of the comminuted goods in a defined direction. In the exemplary embodiment shown in FIG. 5, the rotational direction is understood to mean the clockwise direction.

The rotor 3 shown in FIG. 5 rotates relative to the housing 2, and the housing 2 or the outer drum formed by the housing 2 is rotationally fixed. The axles of the rotor 3 and the housing 2 are disposed so as to be coaxial.

FIG. 6 shows the item shown in FIG. 5 in a front view, in which the angular shape of the rotor 3 and the stepped design of the tools 11 are revealed very clearly. FIG. 6 also clearly shows that the tools 11 are mounted on holding plates 12 that are in turn seated on the attachment strips 13. The holding plates 12 are preferably screwed onto the attachment strips 13. A replacement of the individual tools 11 or holding plates 12 is possible at all times.

Figure 7:
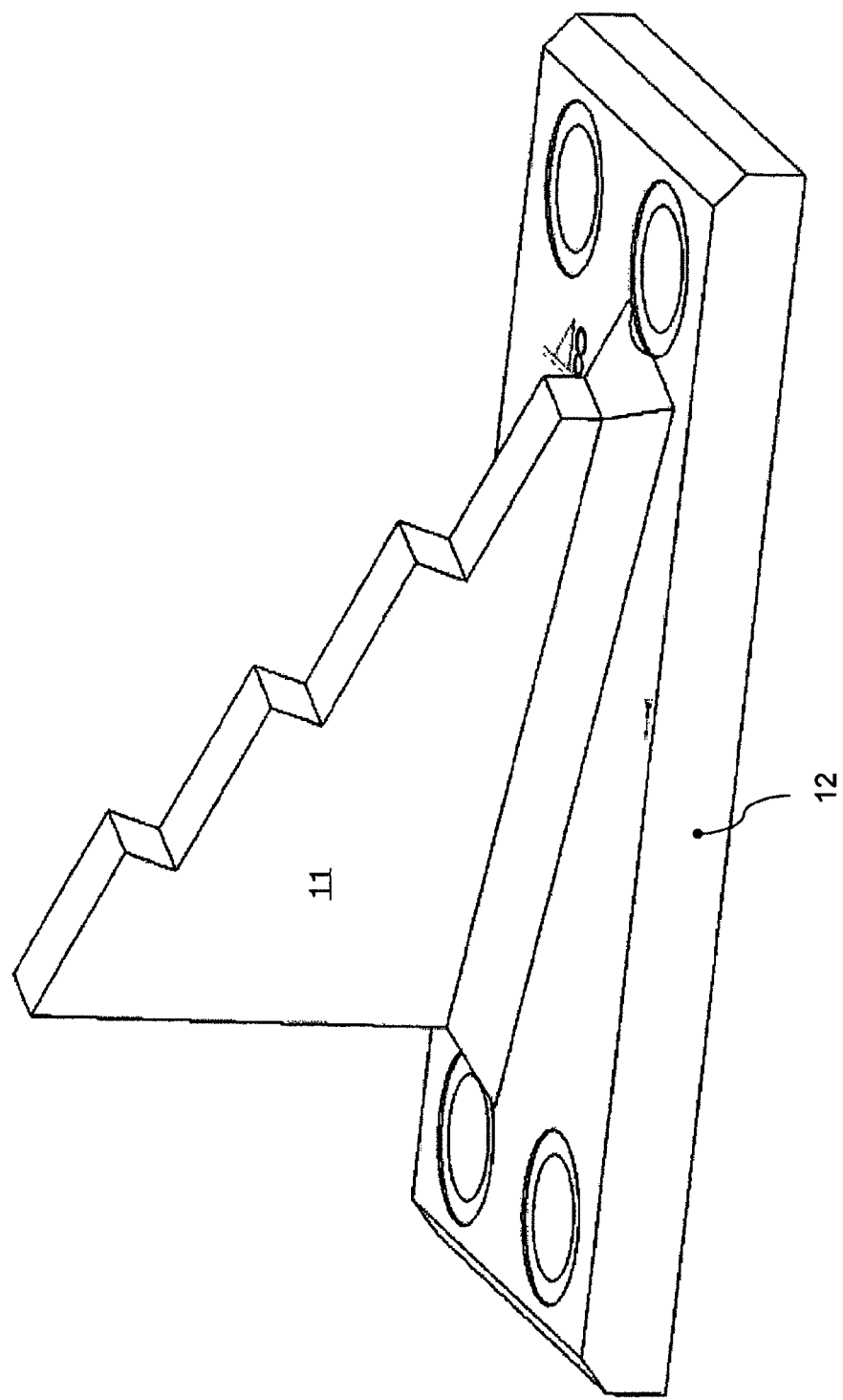
FIG. 7 shows a tool of the rotor disposed on a holding plate in a diagrammatic view that is enlarged in comparison to FIGS. 5 and 6.

FIG. 7 is a detailed and enlarged view of a holding plate 12 comprising a tool 11 disposed thereon, which tool 11 is disposed at an angle and this results in the conveying direction of the material during the rotation of the rotor 3.

The stress-applying means, namely the tools 4, 11, provided in the housing 2 or on the rotor 3 can be mounted on the rotor 3 so as to be stationary or so as to be adjustable in terms of position and angle in order to be able to influence the retention time of the parts to be treated in the apparatus. More particularly, the stress-applying means can be mounted on the rotor 3 so as to be rigid or movable in a tangential direction.

The rotor 3 itself can be disposed in the housing 2 or in the drum so as to be centric or eccentric relative to the drum axle, the drum or the housing 2 being designed so as to be cylindrical or conical relative to the rotational axis of the rotor 3.

It is likewise feasible for the inner side of the drum or the housing 2 to be equipped with elements that influence the trajectory of the parts added.

The inlet of material into the apparatus, i.e., the housing 2 is preferably disposed so as to be tangential to the peripheral movement of the rotor 3 in the rotational direction of the rotor 3.

The outlet of material from the apparatus or the housing 2 is preferably oriented so as to be tangential to the peripheral movement of the rotor 3 in the rotational direction of the rotor 3.

It should be further noted that the apparatus of the invention serves not only for the mere treatment of parts, but also performs an additional function, namely that of disintegrating bales and briquettes and it combines this function with its actual function.

In order to avoid repetitions, reference should be made to the general portion of the description and the attached claims for additional preferred embodiments of the teaching of the invention.

In conclusion, it should be pointed out expressly that the above exemplary embodiment of the teaching of the invention merely serves for discussing the teaching claimed without restricting it to said embodiment.

The invention claimed is:

1. A method for pre-cleaning parts by removing foreign bodies disposed on parts made of plastic as part of a recycling process, said method comprising:

removing labels and dirt disposed on used plastic bottles, wherein the foreign bodies are removed from the parts exclusively mechanically, wherein the foreign bodies are removed from the parts using a forced feed system comprising one or more conveyor screws configured to feed the parts into a housing made of an imperforated material and by applying mechanical stress to the parts using a single rotor equipped with a plurality of tools on its outer face in the form of bars, vanes, or paddles at least in part equipped with blades, the single rotor disposed inside the housing.

2. The method as defined in claim 1, wherein the foreign bodies are removed from the parts by means of a deformation of the parts.

3. The method as defined in claim 2, wherein the foreign bodies are removed from the parts by bending, compressing and/or stretching the parts.

4. The method as defined in claim 1, wherein the foreign bodies are removed from the parts.

5. The method as defined in claim 1, wherein the parts are at least slightly scored or cut as part of the application of mechanical stress.

6. The method as defined in claim 1, wherein before pre-cleaning the parts, the parts are supplied such that they are compacted into bales, and wherein the foreign bodies are removed after the bale is disintegrated or after the parts are isolated from the bale.

7. The method as defined in claim 1, wherein the foreign bodies are removed over a pre-definable retention time over which the parts are pre-cleaned and/or a pre-definable stress intensity.

8. The method as defined in claim 1, wherein the foreign bodies that are removed from the parts are separated.

9. The method as defined in claim 8, wherein the foreign bodies detached and separated from the parts are supplied to a repeat separation process for separating different materials and small plastic portions.

10. The method as defined in claim 9, wherein the small plastic portions are supplied to the pre-cleaning process.

* * * * *